US009151266B2

(12) United States Patent
Bulaclac, Jr.

(10) Patent No.: US 9,151,266 B2
(45) Date of Patent: Oct. 6, 2015

(54) WAVE ENERGY ELECTRICITY GENERATOR (76) Inventor: Anthony Lim Bulaclac, Jr., Loma Linda, CA (US)

( * ) Notice: Subject to any disclaimer, the term of this patent is extended or adjusted under 35 U.S.C. 154(b) by 42 days.

(21) Appl. No.: 13/412,366

(22) Filed: Mar. 5, 2012

(65) Prior Publication Data
US 2013/0068629 A1   Mar. 21, 2013

Related U.S. Application Data (60) Provisional application No. 61/537,400, filed on Sep. 21, 2011.

(51) Int. Cl.
*F03B 13/18* (2006.01)

(52) U.S. Cl.
CPC ......... *F03B 13/1855* (2013.01); *F05B 2220/61* (2013.01); *F05B 2240/93* (2013.01); *F05B 2240/97* (2013.01); *F05B 2260/40* (2013.01); *F05B 2260/40311* (2013.01); *Y02E 10/38* (2013.01); *Y02E 70/10* (2013.01)

(58) Field of Classification Search
USPC ............... 60/497, 501, 507, 608, 495; 290/53
See application file for complete search history.

(56) References Cited

U.S. PATENT DOCUMENTS

| | | | | | |
|---|---|---|---|---|---|
| 3,238,713 | A * | 3/1966 | Wallace | ........................... | 60/608 |
| 4,418,286 | A * | 11/1983 | Scott | ................................. | 290/42 |
| 6,756,695 | B2 * | 6/2004 | Hibbs et al. | ...................... | 290/42 |
| 7,245,041 | B1 * | 7/2007 | Olson | .............................. | 60/497 |
| 7,456,512 | B2 * | 11/2008 | Nadel | .............................. | 290/53 |
| 7,891,183 | B2 | 2/2011 | Al-Huwaider | | |
| 7,980,832 | B2 | 7/2011 | Ahdoot | | |
| 8,035,243 | B1 | 10/2011 | Mesa | | |
| 2009/0165454 | A1 * | 7/2009 | Weinberg | ......................... | 60/497 |
| 2010/0025999 | A1 * | 2/2010 | Kim et al. | ........................ | 290/53 |
| 2011/0198851 | A1 | 8/2011 | Lama | | |
| 2011/0304145 | A1 | 12/2011 | Raisch | | |
| 2013/0341926 | A1 * | 12/2013 | Fay | ................................ | 290/53 |
| 2015/0176561 | A1 * | 6/2015 | Li | .................................. | 290/53 |

* cited by examiner

*Primary Examiner* — Kenneth Bomberg
*Assistant Examiner* — Paul Thiede
(74) *Attorney, Agent, or Firm* — Kirk A. Buhler; Buhler & Associates (57) ABSTRACT

Improvements in an ocean wave energy conversion unit that converts kinetic energy from oceanic waves into useable form of energy that will benefit society called and Aqua-tamer. The unit is designed to be modular in nature where the units can be deployed to function individually or assembled into groups where units will rely on each other and function together as a whole. Each individual unit has an electrical output. As a group (Colony) during deep sea surface applications, the electrical output of each Aqua-Tamer unit will be consolidated and used to operate a water-electrolysis operation that produces Oxygen Gas (O2) and Hydrogen Gas (H2). This production of O2 and H2, instead of electrical output, is designed to eliminate the requirements of an Ocean-wide electrical grid system and still facilitate an economic logistically efficient) method of energy transportation (energy in a gas state.

18 Claims, 8 Drawing Sheets

WAVE ENERGY ELECTRICITY GENERATOR

CROSS REFERENCE TO RELATED APPLICATION

This application claims the benefit of Provisional Application Ser. No. 61/537,400 filed Sep. 21, 2011 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

This invention related to improvements in power generation. More particularly, the present Aqua-tamer converts kinetic energy from oceanic waves into a useable form of energy that will benefit society.

2. Description of Related Art Including Information Disclosed Under 37 CFR 1.97 and 1.98

A number of patents and/or publication have been made to address clean power generation and more specifically power generation from harnessing wave and/or tide motion. Exemplary examples of patents and or publications that try to address this/these problem(s) are identified and discussed below.

To best explain the mechanical function of this electricity generating unit, let us first define and describe the function of the common gasoline powered (Otto or Diesel cycle), rear wheel drive, automobile. The automobile is essentially an energy converter that converts chemical potential energy in the form of hydrocarbons (gasoline) into kinetic energy that the operator utilizes for transportation. The engine converts chemical potential into pressure through combustion and eventually into shaft horsepower. This power output is then transmitted through a drive-train and eventually to the wheels that convert rotational movement into translational. So, essentially, we as automobile operators use gasoline and our energy converter (the automobile) to make use of the gasoline has to provide for our transportation purposes.

U.S. Pat. No. 7,980,832 that issued on Jul. 19, 2011 to Ned M. Ahdoot and patent publication 2001/0304145 that published on Dec. 15, 2011 to Netanel Raisch both disclose devices that convert wave energy. Both of these devices have the majority of the device sitting above the waves and float above the surface. These patents are not anchored to a base with a self-contained enclosed generating system.

U.S. Publication 2010/0025999 that was published on Feb. 4, 2010 for Chong Hun Kim et al that published on Aug. 18, 2011 for Arturo Lama both disclosed wave electric power generation. Both of these publications use the force of an incoming wave to generate electricity. They do not rely on buoyancy to generate electricity and therefore can mostly be used near a shoreline as opposed to the open ocean.

U.S. Pat. No. 8,035,234 issued on Oct. 11, 2011 to Manuel Constanzo Mesa discloses a system to obtain energy from water waves. The system involves an array or matrix of individual floats that individually move up and down as a wave propagates through the matrix of floats. This patent does not utilize a single buoyancy member that floats with a wave. It also requires a significant amount of ocean surface area and utilizes a complex structure with multiple redundant sets of moving parts.

What is needed is simple single structure with a base that is secured to the ocean floor. The structure has vertical linear members where a buoyant floatation electricity generating mechanism is mounted to allow the device to both ride with the waves and tide to convert kinetic energy from oceanic waves. The disclosed device provides a solution to this problem.

BRIEF SUMMARY OF THE INVENTION

It is an object of the Aqua-Tamer to convert kinetic energy from oceanic waves into a useable form of energy that will benefit society. The unit is designed to be modular in nature where units can be deployed to function individually or assembled into groups where units will rely on each other and function together as a whole. The main product of each individual unit is electrical output. As a group (Colony) during deep sea surface applications, the electrical output of each Aqua-Tamer unit will be consolidated and used to operate a water-electrolysis operation that produces Oxygen Gas ($O_2$) and hydrogen Gas ($H_2$). This production of $O_2$ and $H_2$, instead of electrical output, is designed to eliminate the requirement of an Ocean wide electrical grid system and still facilitate an economic (logistically efficient) method of energy transportation (energy as a gas state).

It is another object of the Aqua-Tamer to be a modular design that facilitates a more efficient installation/assembly, and most importantly, recovery and replacement operations that are driven by scheduled and unscheduled maintenance. The components are replaceable as interchangeable pieces that allow simple removal and replacement as required to maintain and/or repair a unit.

It is still another object of the Aqua-Tamer for the unit to be of an economic construction demand. The unit's design is similar to that of the common automobile and should be built like one within the same price range. Other wave power generation units incorporate highly specified technologies that require special construction demands and the return of investment due to its competitive performance and low cost of construction, assembly, maintenance, and operation.

Various objects, features, aspects, and advantages of the present invention will become more apparent from the following detailed description of preferred embodiments of the invention, along with the accompanying drawings in which like numerals represent like components.

BRIEF DESCRIPTION OF THE SEVERAL VIEWS OF THE DRAWING(S)

FIG. 3 also depicts the rotational behavior of different segments of the drive train.

DETAILED DESCRIPTION OF THE INVENTION

The Unit

Figure 1:
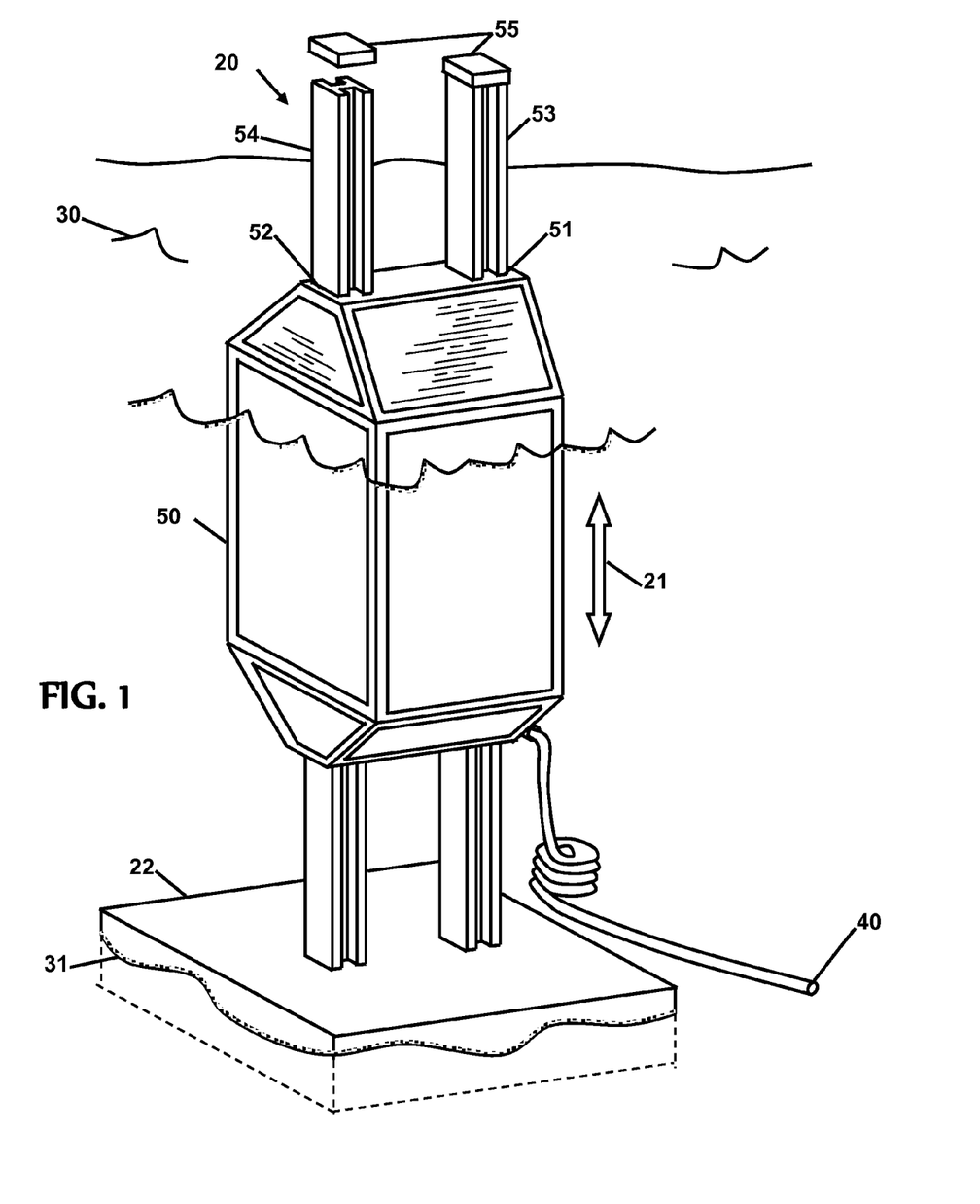
FIG. 1 shows an individual electricity generating unit.

FIG. 1 shows an individual electricity generating unit 20. Each individual unit 20 functions to convert kinetic energy from ocean waves 30 into electrical output 40. This unit 20 is essentially an automobile with a backwards flow of energy. The unit 20 is designed to be a heavy but very buoyant machine that is enclosed in a water-tight container 50. As seen in FIG. 1, there are two vertical holes 51 and 52 that go through the water-tight unit 50. The purpose of these holes 51 and 52 is to allow the traction-beam(s) 53 and 54 to go through the water-tight container 50 and provide traction to exposed wheels (not shown in this view) inside of holes 51 and 52. The top of each traction-beam 53 and 54 is capped with a retention cap 55.

Figure 3:
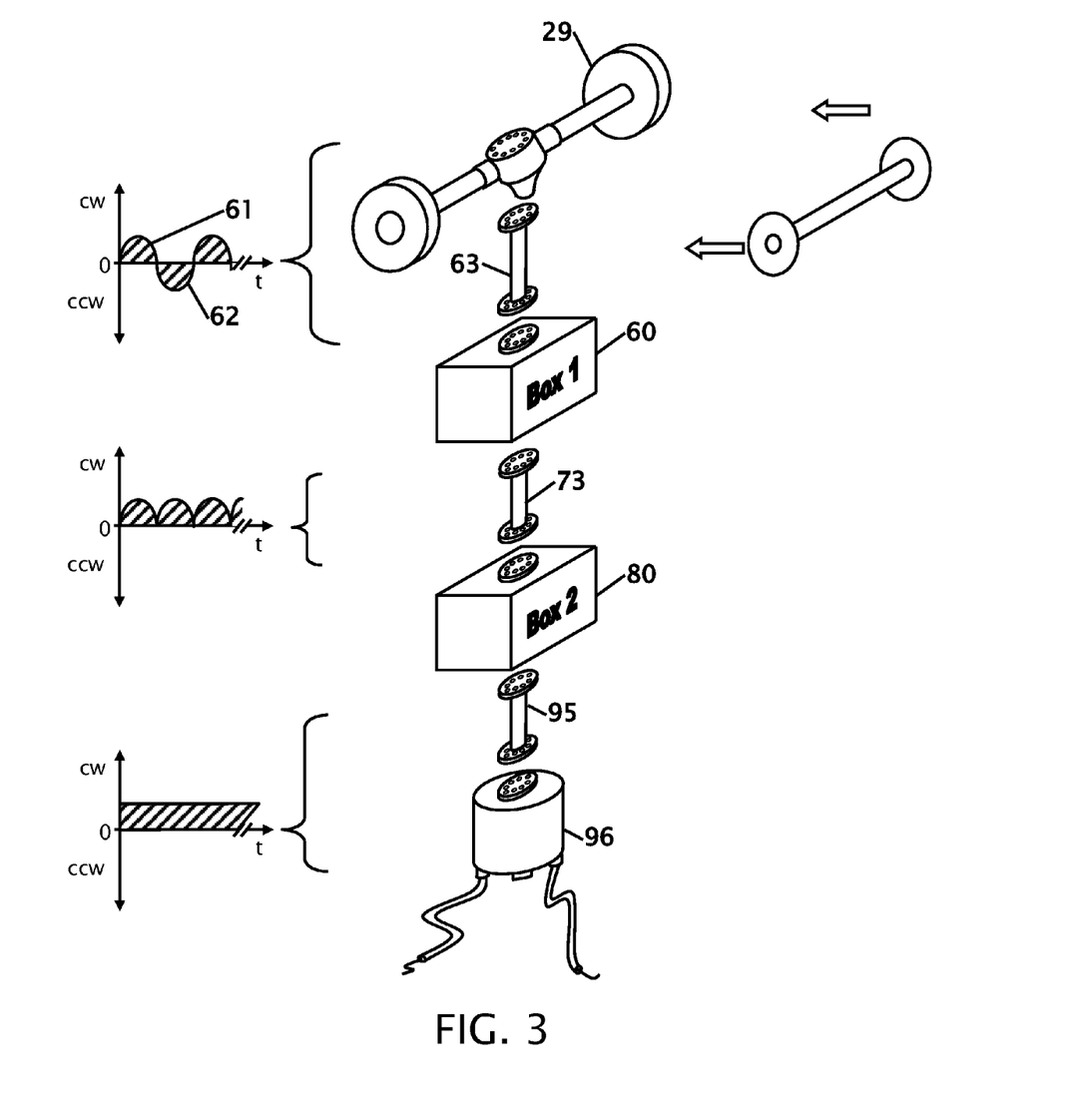
FIG. 3 shows the wheels taking the translational motion of the unit relative to the traction beams and converts it into rotational motion.

The wheels 29 are the first contact of the outside forces to the drive train. As seen in FIG. 3, the wheels 29 take the translational motion of the unit relative to the traction beams and convert it into rotational motion. This rotational motion is transmitted through a differential (does not necessarily have to be differential because there should not be a situation where one wheel turns faster than the other) and a drive shaft to the input shaft of Box I 60.

Figure 4:
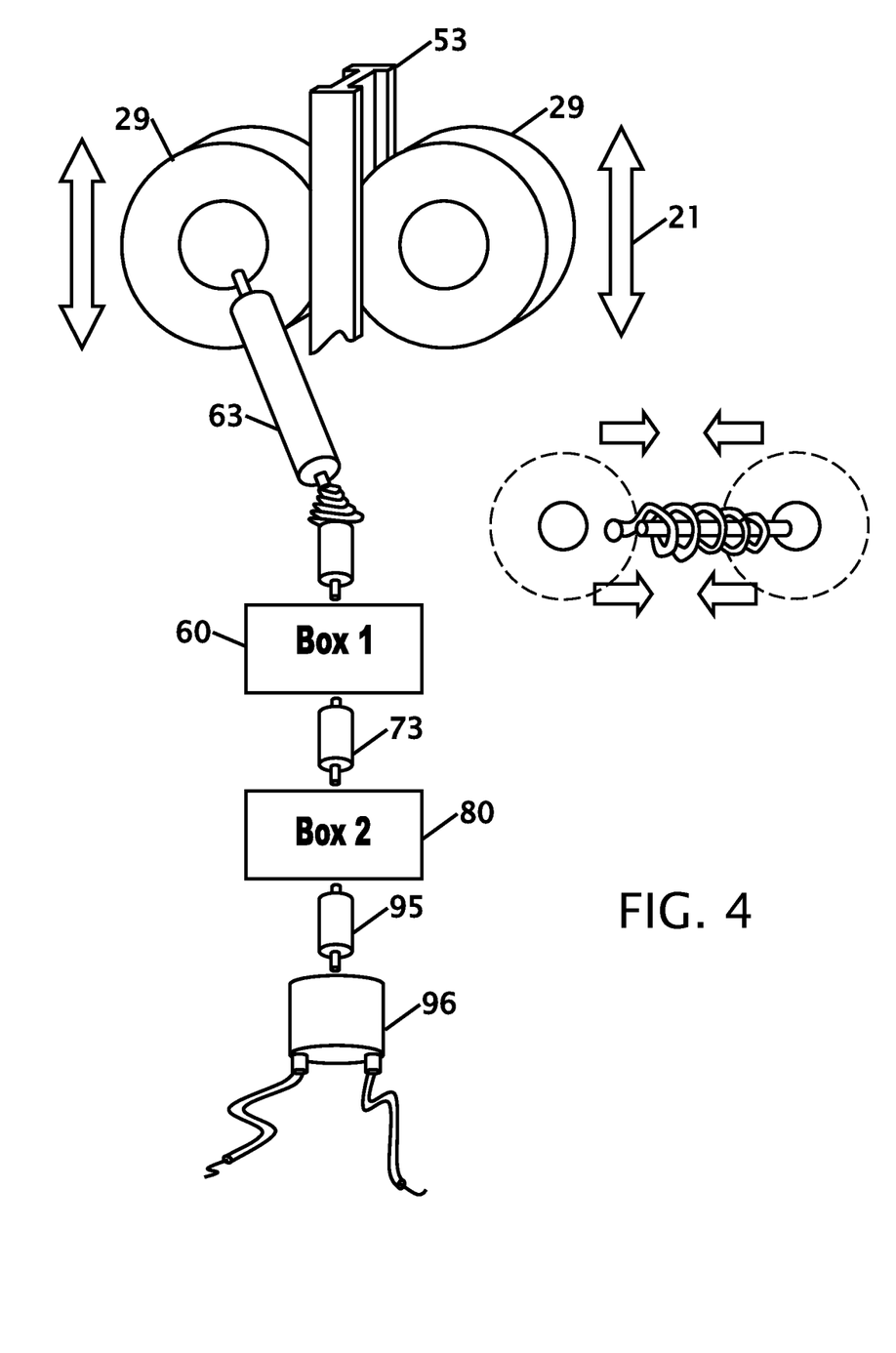
FIG. 4 shows a detail view of the wheels and their interaction with the traction beams.

FIG. 4 shows a detail view of the drive wheels 29 on the traction beams 53 showing wave energy power being transferred through the input shaft 63 through box 1 60, output shaft 73, through box 2 80, through output shaft 95 and into generator 96.

Box I

The purpose of Box I 60 is to convert oscillatory rotational motion into impulsive but unidirectional motion. FIG. 3 is an illustration that shows a sinusoidal wave function on the top-left corner of the figure that reflects the nature of the ocean wave and the unit's bobbing/oscillatory motion. The drive shaft will at one point begin to turn clockwise 61, reach its peak clockwise rotational speed, slow down, stop, and begin to turn counterclockwise 62 and continue the same course repeatedly as a function of time as shown in the top graph. These series of motions will occur as the unit oscillates up and down 21 in response to the passing of ocean waves 30.

Figure 5:
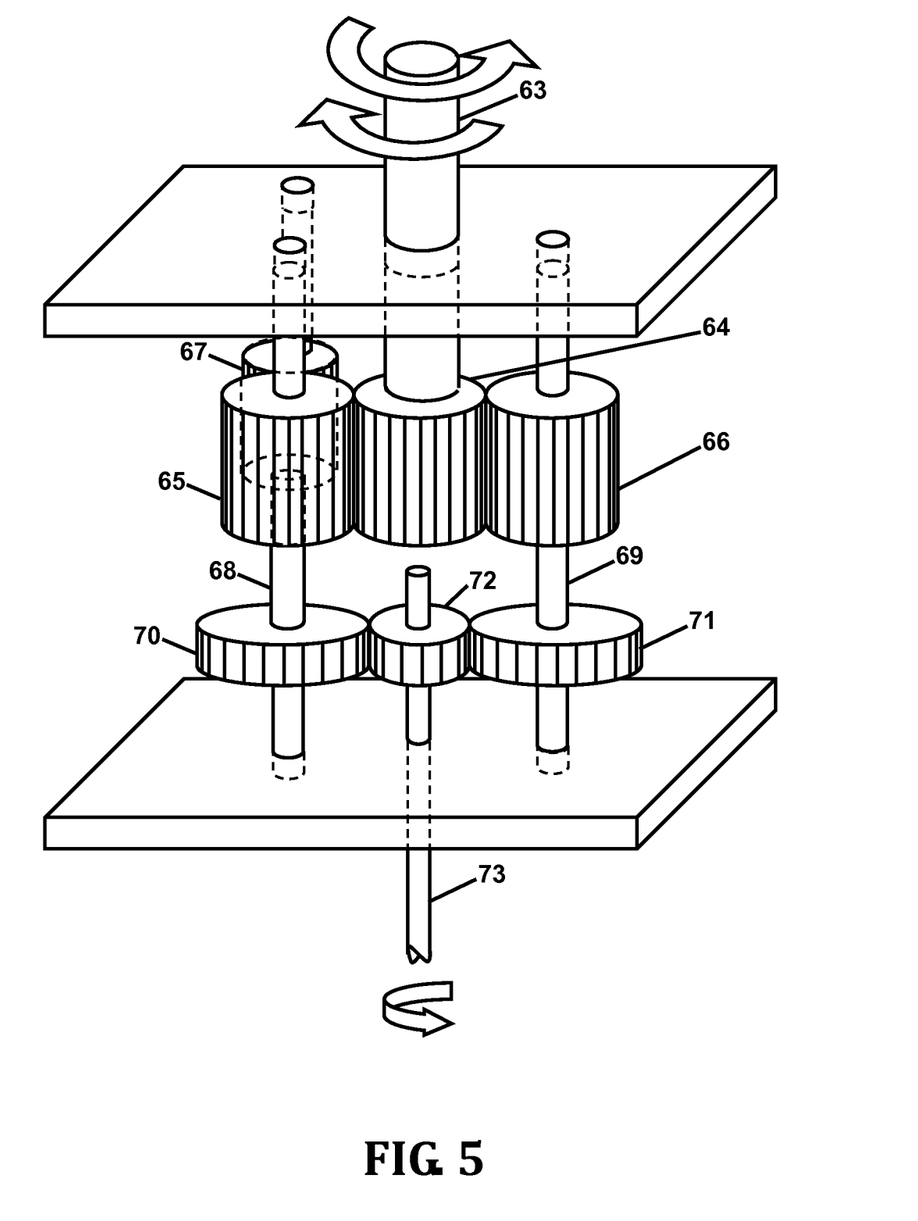
FIG. 5 shows the functioning components within Box 1 60 located inside the unit 20.

Taking a closer look at the functioning components within Box I 60, FIG. 5 shows how the input shaft 63 is connected and coupled to an input gear 64. The input gear 64 is then connected to an idler gear 65 which is connected to a sprag clutch 67. Besides being connected to the idler gear 65 the input gear 64 is also connected to another sprag clutch or roller clutch 66 that is oriented to actively turn and release the same direction to that sprag clutch or roller clutch 67. Both of these clutches 67 and 66 are attached to their own shafts 68 and 69 respectively.

Each of these shafts 68 and 69 have additional gears 70 and 71 respectively that are both connected to the Output Gear 72. With this design that incorporates two opposing one-way clutches 67 and 66, with connecting gears 70 and 71, the output shaft 1 60 can be designed to turn clockwise regardless of the rotational direction of the input shaft 63. This is because, at any given time, only one of the two clutches 67 or 66 is in active mode while the other is in release/slip mode.

A better way to understand the function of Box 1 60 would be by analyzing the flow of power through the system and the effects of its power to each individual component. For instance, if the input shaft 63 was turning counterclockwise (from the overhead perspective), Clutch 66 will be in active mode and effectively transmitting the mechanical power of the input gear 63 to Shaft 69 as well as Connecting Gear 71.

Through Connecting Gear 71, this movement is transferred to the Output Gear 72 and then to Connecting Gear 70 and back up to Shaft 68. Shifting our focus to the relationship between the Input Gear 64 and Idler Gear 65 and Clutch 67, we notice that because the input gear 64 is turning counterclockwise, the idler gear 65 is turning clockwise which is making Clutch 67 turn counter-clockwise to freewheel, relaxed or slip its rotational direction and transmit no power. With these concepts in mind, we can see that Clutch 67 is turning counter-clockwise, but shaft 68, because of the driving force from connecting gear 70 and the output gear 72 and connecting gear 71, is actually turning clockwise (a completely opposite direction). Thus, when any of the two Clutches 67 or 66 are turning in the freewheel (relaxed) direction (counter-clockwise), their respective shaft 68 or 69 is turning at the same speed but in the opposite direction (clockwise). In fact, shafts 68 and 69 and connecting gears 70 and 71 will always turn clockwise.

When the input shaft 63 is turning clockwise, power is transmitted through idler gear 65, clutch 67 (in its active direction) through shaft 68 and to shaft 69 through connecting gears 70 and 71 and the output gear 72. This time, clutch 66 is turning counter-clockwise in its freewheel direction while shaft 69 is turning clockwise at the same speed. In this preferred embodiment, whether the input gear is turning clockwise or counter-clockwise, the connecting gears 70 and 71 and the output gear 72 is turning the same direction (in this case clockwise).

Box II 80

The purpose of Box II 80 is to convert unidirectional and impulsive rotational motion into a unidirectional constant speed rotational motion. FIG. 3 shows the sinusoidal function located on the left side of the page in the middle graph. Due to the nature of the mechanical output from Box I 60, the rotational motion of the input for Box II 80 is unidirectional but does not have a constant speed. The purpose of Box II 80 is to convert this non-constant rotational input speed of output shaft 73 into a rotational output with a constant speed tailored to match the rotational rate in which an attached generator maximizes its operational efficiency.

Figure 6:
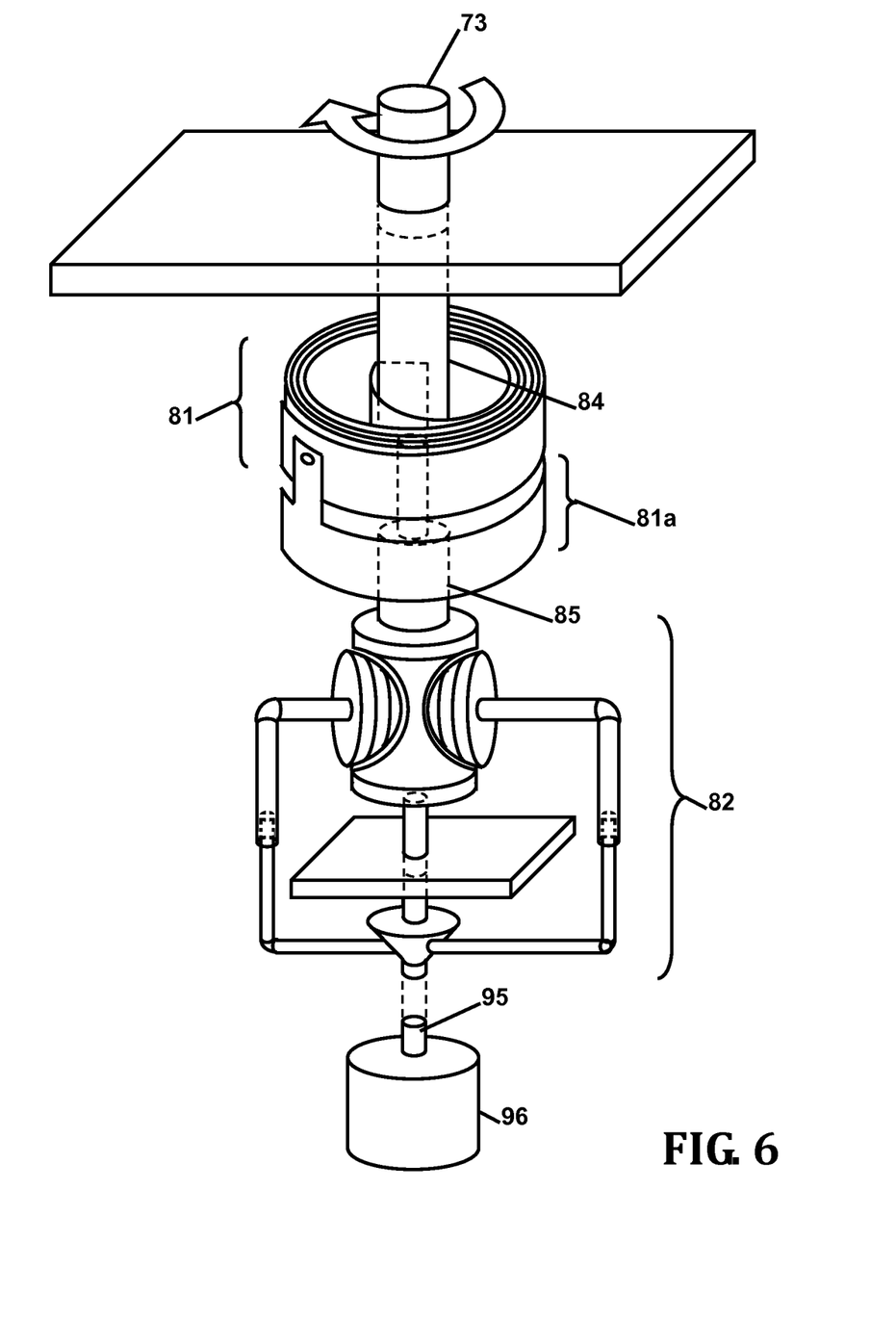
FIG. 6 shows the transmission of rotational motion from the intermediate shaft 84 to the constant-force coil spring 81 and to the continuously variable transmission (CVT) 82.
Figure 7:
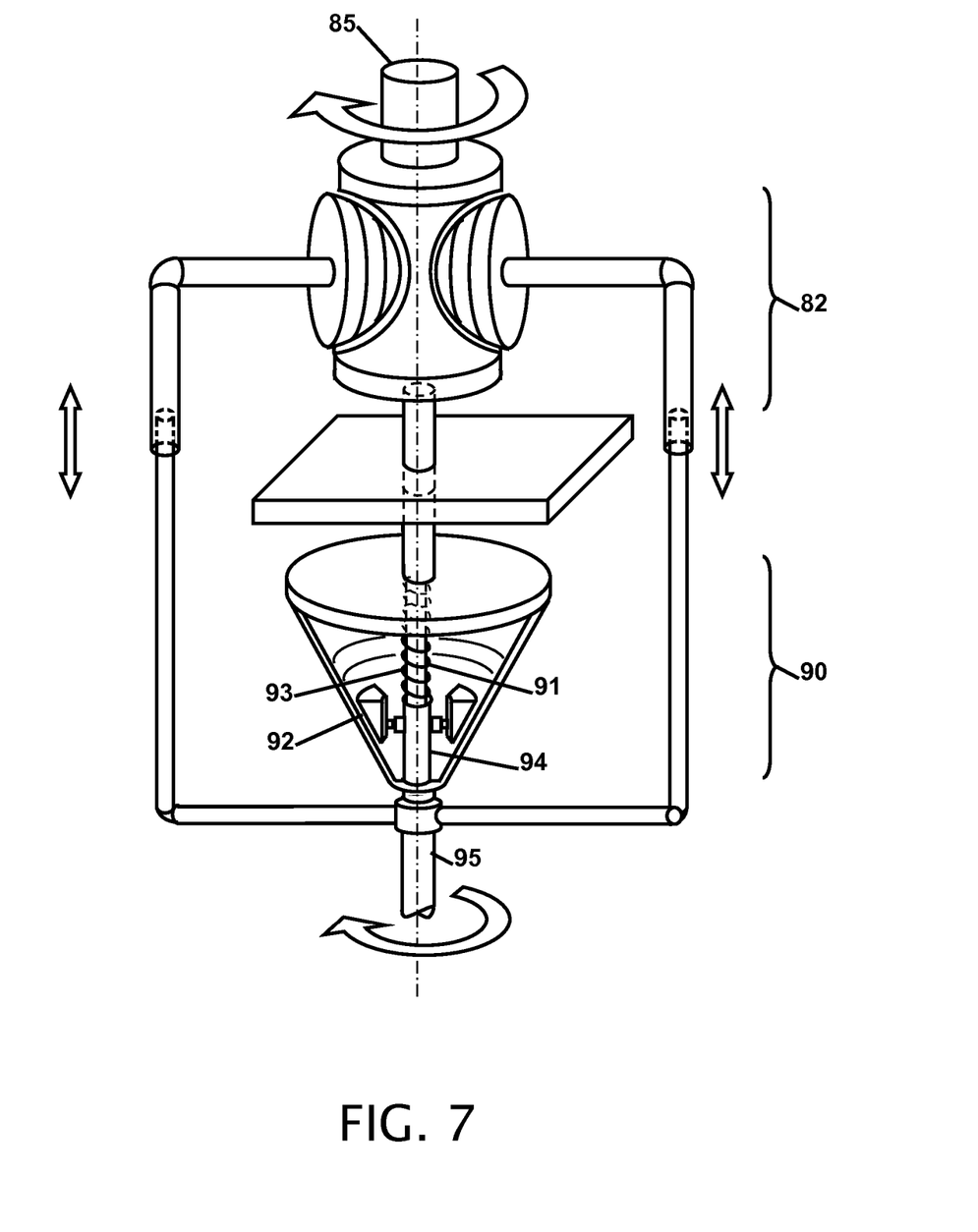
FIG. 7 shows how the continuously variable transmission is controlled through the use of the mechanical speed regulator 90 to maintain a constant output rotational speed.

Box II 80 is able to accomplish its function through the utilization of a constant force coil spring 81 and a continuously variable transmission 82 as shown in FIGS. 6 and 7. The constant force coil spring 81 converts and temporarily stores the mechanical (kinetic) input from Box I 60. The output end of this spring, in turn, applies a relatively constant force to the intermediate shaft adapter 81a which, in turn, transfers rotational motion to the intermediate shaft 85.

This intermediate shaft 85 then transmits rotational motion to the continuously variable transmission 82 as shown in FIG. 6. The illustration 82 in FIG. 6 depicts a roller-bearing variant of a CVT, but any type of CVT may be utilized to achieve the optimal performance of the unit. FIG. 7 shows the continuously variable transmission 82 that uses the input from a mechanical speed regulator 90 that continuously adjusts the torque (through gear ratio) of the CVT 82 to maintain a constant output rotational speed of Box I's output shaft 95. The mechanical speed regulator 90 is able to function through the use of a spring 91 and centrifugal weights 92. As the shaft 93 and sleeve 94 increases in rotational motion, the revolving weights 92 increase their centrifugal force which in turn counteracts the force applied by the internal spring 91 and moves the rotating sleeve 94 and the regulator's associated control linkages to increase the torque (gear) ratio of the continuously variable transmission 82. This increase in torque ration will decrease the speed of the output shaft. The opposite logic applies when the speed of the shaft decreases. The desired speed of the output shaft will be adjustable through refined adjustment in the regulator's components that include but not limited to the internal spring 91 and revolving weights 92.

Figure 8:
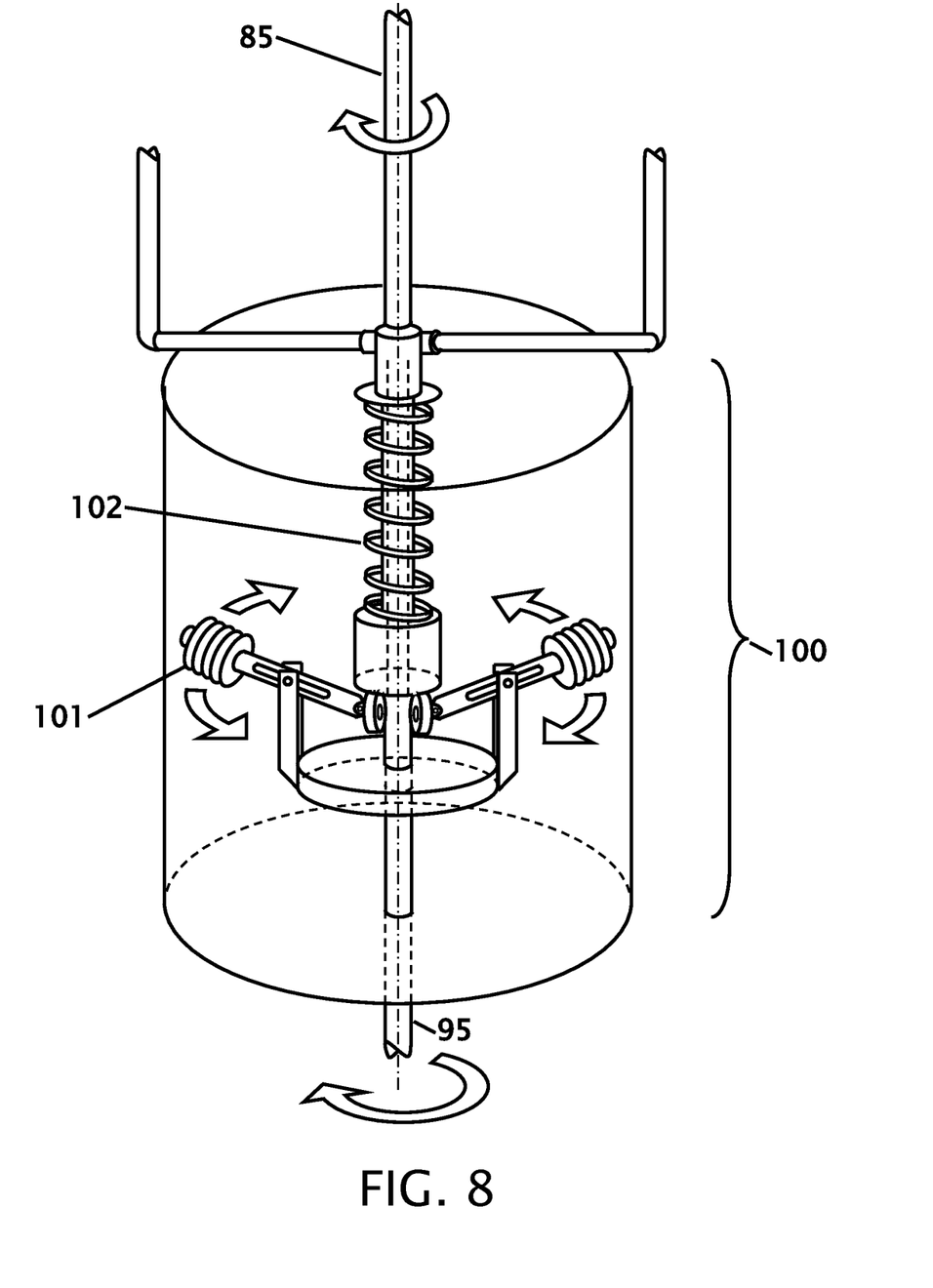
FIG. 8 shows an alternative and improved embodiment for the continuously variable transmission mechanical speed regulator.

FIG. 8 shows a second (improved) embodiment for the continuously variable transmission's mechanical speed regulator 100. This speed regulator's function is identical to that of the regulator as shown and described with FIG. 7 but is able to further eliminate frictional forces present in FIG. 7 which enable it to perform more efficiently.

Through fine tuning and adjustments of the mechanical speed regulator 100, to include but not limited to changes in centrifugal weights 101 and internal spring 102 design, the mechanical speed regulator 100 can be tuned to maintain a constant output speed that matched that of the maximum operating efficiency of the attached generator.

Shallow Water Surface Application

In offshore (shallow water) applications, each unit will function independently. The unit's supporting tracks 54 & 53 as shown and described in FIG. 1 will be directly emplaced in the sea (or any body of water) floor 31 and reinforced be a stable foundation 22. With this design, as ocean waves 30 pass be, the traction beams 53 and 54 retain their position while the unit oscillates 21 along the passing of the wave 30 and converts the wave's kinetic energy into electrical output. This electrical output will be directly connected 40 to a nearby electrical consolidation facility (through a sea-floor based grid system) which, in turn, is connected to the main grid for delivery to the customers.

Deep-Sea Surface Application

Figure 2:
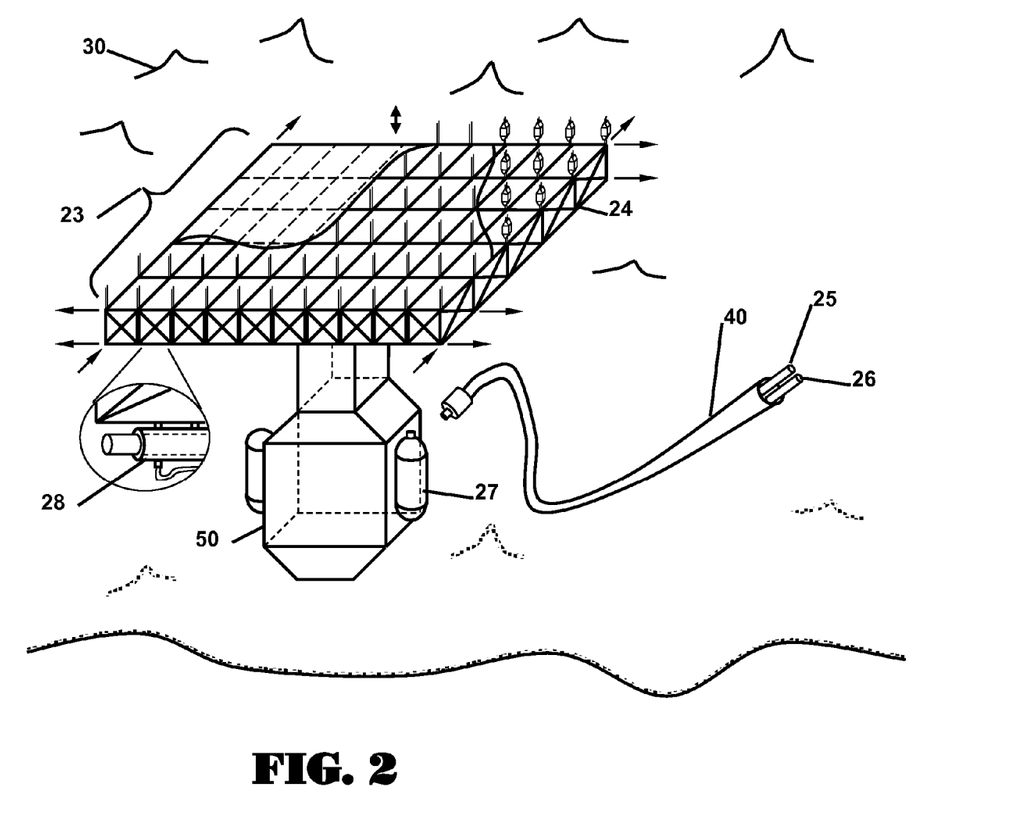
FIG. 2 shows each colony as a whole that will maintain a stable vertical position that is equal to the cumulative-average surface-height of the area of water that the colony occupies.

In deep-sea surface applications, units 20 will be deployed in groups called "Colonies" and assembled together through a common supporting structure as shown in FIG. 2. Each colony 23 as a whole will maintain a stable vertical position that is equal to the cumulative-average surface-height of the sea of water that the colony 23 occupies.

Despite the relatively stable position of the colony 23 as a whole, each of the many units 20 of the colony 23 is composed of are experiencing independent vertical movement 21 that corresponds to a passing of an oceanic wave 30 that causes a difference between the surface heights of each unit's 21 immediate water area to that of the cumulative average of the colony 23. Thus, although the colony 23 appears to be stable as a whole, each of the many units 30 it is composed of is actually working had to tear apart the (indestructible) structure as they independently gather energy.

Attached to the supporting structure 24 and serving multiple purposes is the Colony's 23 Hub 50. The most important purpose of the Hub 50 is to consolidate all of the electrical output of the attached units and use this energy to power a continuously operating electrolysis reaction that produces Hydrogen Gas (H2) 25 and Oxygen Gas (O2) 26 as well as power a water purifying process that produces the pure water necessary for the electrolysis reaction. The Hub then accumulates the Hydrogen 25 and Oxygen 26 gases and store them in separate (volume variable) storage tanks. These storage tanks 27 are capable of changing their volume (size) as necessary to induce a vacuum that may be necessary for accumulating gas from the electrolysis process as well as a higher pressure for rejecting gas through an output port for collection by a collecting vessel.

Another function of the Colony's 23 Hub 50 is to serve as the controlling unit for the Colony's Buoyancy Control System (BCS). The BCS is comprised of expandable tubes 28 strategically and equally positioned (so not to apply any unnecessary stress to the structure) throughout the grid structure to provide equal buoyant forces throughout the colony 23. The Hub is able to control the BCS through a series of pneumatic lines that connect many independent expandable tubes to the Hub's air pressure control section. The purpose of the BCS is to allow the Colony's 23 Hub 50 to control the colony's 23 vertical position compared to that of the surface of the body of water. In the event a destructive storm passes through the surface of the body of water, the Colony 23, through its BCS, is capable of halting its energy generating process and submerges well below the surface of the water and remains relatively unaffected by the surface storm. As the storm passes and a safe continuation of operation is assured, the Colony 23, through its BCS, will be able to resurface and continue its energy Harnessing operations.

As an additional (optional) feature, the Colony's Hub will have a capability of dropping an anchor to the sea floor. This feature will enable the unit to passively maintain surface position even with the influence of sea currents.

Functions of the Hub that requires deliberate decision-making control to include its BCS as well as the Hub's troubleshooting and unit-monitoring processes will be controlled by a human operated control center that maintains communications with the units through satellite signals to and from each colony. Through this controlling and monitoring system, the company will be able to continuously monitor each colony and their components' performance and operational health. When the situation dictates that service is required due to either scheduled or unscheduled maintenance, the issues will be addressed by a nearby maintenance/collecting vessel.

With respect to the previously mentioned stored gas rejection process, the transfer of stored Hydrogen 25 and Oxygen 26 gases from their storage tanks to a collection ship is very similar to the process of inflating an under-pressured or flat tire in the common automobile. A hose that is attached to the collection tank of a collecting ship will be extended, guided, and connected (potentially by a remote controlled guide-robot) to a consolidated output port of the storage tanks 27 of the colony. The higher pressure of gases in the storage tanks 27 (partially induced by a contraction of the storage tanks) and an induced vacuum in the collecting ship's tank will drive an efficient and speedy gas/fuel transfer from the colony to the collecting vessel.

Modular Design

One of the most advantageous aspects of this design is its modular nature. In the even that a unit 20 breaks or requires scheduled maintenance, a collection ship will simply remove the retention caps on the specified unit's tracks, remove the unit 20 that requires maintenance, replace it with a new unit 20, reinstall the retention caps, and initiate the new unit's energy gathering operation. The newly removed unit that requires maintenance or repair will be placed onboard the collecting/maintenance vessel/ship and transported back to a designated maintenance facility for service.

In addition to the modular nature of each unit's installation to the colony, all of the other components of the colony will be modular in nature as well. This includes the easy detachment and replacement of multiple segments of the colony's truss system for maintenance purposes.

Thus, specific embodiments of an Aqua-Tamer have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A wave energy conversion system to produce electricity, comprising:
    at least one buoyant unit having a container defining a space therein, said container being disposed in a liquid environment that includes a liquid having liquid waves;
    at least one beam having a length being received through the space and fixedly secured at a fixed point at one end of the at least one beam disposed external to the container, said at least one beam including a retention cap removably attached to a free end of the at least one beam;
    at least one drive wheel that engagingly moves along a surface of the at least one beam in a direction along the length of the at least one beam in relation to the fixed point when said at least one buoyant unit has generally vertical, linear translational movement due to rising and falling of said liquid waves to produce an oscillatory rotational motion a in response thereto;
    at least one transmission that receives and converts said oscillatory rotational motion to unidirectional rotational motion;
    a generator that receives and is driven by said unidirectional rotational motion to produce said electricity, and
    wherein the at least one drive wheel, the at least one transmission, and the generator, are disposed in the space and when the retention cap is removed from the free end of the at least one beam, the at least one buoyant unit is removable from the at least one beam in a manner such that when removed outwardly away from the at least one beam to a position external to the at least one beam, the at least one beam is not disposed in the space.

2. The wave energy conversion system of claim 1, wherein the fixed point is one of a floor of the liquid environment beneath said liquid waves and a supporting structure disposed intermediate a surface of the liquid environment and said floor of the liquid environment.

3. The wave energy conversion system of claim 2, wherein when the fixed point of the supporting structure is selected, said supporting structure contains at least two sets of said fixed points to combine at least two buoyant units into at least one larger unit.

4. The wave energy conversion system of claim 3, wherein said at least one larger unit has at least one buoyancy control system to control said at least one larger unit's vertical, linear translational movement relative to the surface of said liquid environment.

5. The wave energy conversion system of claim 4, wherein said at least one buoyancy control system includes expandable pneumatic tubes that are equally positioned throughout said supporting structure.

6. The wave energy conversion system of claim 5, wherein said at least one buoyancy control system controls said at least one larger unit's vertical, linear translational movement in said liquid environment in a direction generally perpendicular to the surface of said liquid through expansion and contraction of said expandable pneumatic tubes.

7. The wave energy conversion system of claim 3, wherein said at least one larger unit is controlled and managed by at least one control station.

8. The wave energy conversion system of claim 7, wherein said at least one control station has control over an at least one buoyancy control system.

9. The wave energy conversion system of claim 7, wherein said at least one control station consolidates the electricity that is output from said at least two buoyant units incorporated in said at least one larger unit.

10. The wave energy conversion system of claim 9, wherein said at least one control station utilizes at least one water electrolysis operation.

11. The wave energy conversion system of claim 1, wherein the liquid environment has a surface and the at least one buoyant unit generally floats at said surface in a manner such that the at least one beam is generally disposed in said space transverse to said surface.

12. The wave energy conversion system of claim 11, wherein the direction of said at least one buoyant unit's generally vertical, linear translational movement is transverse to said surface.

13. The wave energy conversion system of claim 1, wherein the direction is a first direction and the direction further includes a second direction opposite the first direction along the length of the at least one beam, and the at least one drive wheel moves in at least one of the first and the second direction due to said generally vertical, linear translational movement.

14. The wave energy conversion system of claim 1, wherein the liquid environment is a water environment and the liquid waves are water waves.

15. The wave energy conversion system of claim 14, where in the water environment is an ocean, a sea, or any body of water.

16. The wave energy conversion system of claim 1, wherein the at least one transmission is also disposed in the space with the at least one drive wheel, and when the container is disposed in the liquid, the liquid does not fill the space.

17. The wave energy conversion system of claim 1, wherein the at least one transmission further includes:
    a first rotational shaft,
    a second rotational shaft,
    a third rotational shaft,
    a first transmission, and
    a second transmission, the first rotational shaft being in communication with the at least one drive wheel and the first transmission,
    the second rotational shaft being in communication with the first transmission and the second transmission, and
    the third rotational shaft being in communication with the second transmission and the generator, wherein the generator is also disposed in the space.

18. The wave energy conversion system of claim 17, wherein the first transmission converts the rotational motion of the at least one drive wheel into unidirectional motion and the second transmission converts the unidirectional motion into unidirectional constant speed rotational motion, and
    the first transmission further includes
    an input gear,
    an idler gear, and
    a clutch, wherein the first rotational shaft communicates with the input gear, the input gear communicates with the idler gear, and the idler gear communicates with the clutch, and the second transmission further includes a coil spring, and a continuously variable transmission that includes a spring and centrifugal weights, wherein the coil spring is in communication with the second rotational shaft and the continuously variable transmission and the continuously variable transmission is in communication with the third rotational shaft.

* * * * *